(No Model.)

H. BOHLS.
CIGARETTE MACHINE.

No. 445,036. Patented Jan. 20, 1891.

Witnesses:
Edwin Cause
Jas. W. Nahan

Inventor:
Henry Bohls,
by Atty W. T. Howard
attys (No Model.) 7 Sheets—Sheet 2.

H. BOHLS.
CIGARETTE MACHINE.

No. 445,036. Patented Jan. 20, 1891.

Witnesses:
Edwin Cruse
Jas. W. Snolan

Inventor:
Henry Bohls
by G. H. W. T. Howard
atty.

(No Model.) 7 Sheets—Sheet 3.
H. BOHLS.
CIGARETTE MACHINE.

No. 445,036. Patented Jan. 20, 1891.

(No Model.) 7 Sheets—Sheet 4.

H. BOHLS.
CIGARETTE MACHINE.

No. 445,036. Patented Jan. 20, 1891.

Witnesses:
Edwin Luse
Jas. W. Graham

Inventor:
Henry Bohls,

(No Model.)  7 Sheets—Sheet 5.

H. BOHLS.
CIGARETTE MACHINE.

No. 445,036. Patented Jan. 20, 1891.

Witnesses:
Edwin Cruse
Jas. W. Iraton

Inventor:
Henry Bohls,
by G. H. W. T. Howard,
Atty.

(No Model.)   7 Sheets—Sheet 7.

H. BOHLS.
CIGARETTE MACHINE.

No. 445,036.   Patented Jan. 20, 1891.

Witnesses:
Edwin Cruse
Jas. W. Ingraham

Inventor:
Henry Bohl,
by Geo. W. T. Howard,
atty.

UNITED STATES PATENT OFFICE.

HENRY BOHLS, OF SAN FRANCISCO, CALIFORNIA, ASSIGNOR TO THE BOHLS CIGARETTE MACHINE COMPANY, OF LYNCHBURG, VIRGINIA.

CIGARETTE-MACHINE.

SPECIFICATION forming part of Letters Patent No. 445,036, dated January 20, 1891.

Application filed April 21, 1890. Serial No. 348,804. (No model.)

*To all whom it may concern:*

Be it known that I, HENRY BOHLS, of the city and county of San Francisco, State of California, have invented certain new and useful Improvements in Cigarette-Machines, of which the following is a specification, reference being had to the accompanying drawings, and to the letters of reference marked thereon.

This invention relates to devices and mechanisms and combinations of the same for producing and wrapping a continuous roll or filler of shredded tobacco into the form of a continuous cigarette and cutting it into definite lengths.

The invention comprises, first, an automatic tobacco dressing and feeding mechanism of novel construction and operation, designed to distribute the tobacco upon an endless traveling feed-belt in an even and uniform manner, and certain devices to condense and bring the tobacco to shape in a continuous strip or roll of even thickness upon the feed-belt before entering the filler-shaping mechanism, and, secondly, a combination, with this feed-belt, of filler-shaping belts, by which the tobacco is suitably compressed and brought to shape, paper wrapping, feeding, folding, and pasting devices, and a grooved wheel to cooperate with the before-mentioned mechanisms and devices to carry away the continuous cigarette and deliver it regularly to a cutting device, all as hereinafter fully set forth.

In the drawings, Fig. 13 is a top view of Fig. 12, and Figs. 14 and 15 cross-sections through these figures at the line *z z* and *a b*, respectively.

With respect to the general construction of the cigarette-forming machine proper—that is to say, the parts irrespective of the tobacco dressing and distributing mechanism—the filler-forming mechanisms and the paper-wrapping and pasting devices are arranged for operation in line with the grooved rim of the carrying-wheel upon one side of its axis, and the continuous cigarette confined in the groove of the wheel is carried around to the cutting device situated on the opposite side of the axis. All the working parts are driven from the principal shaft 2, which is placed behind the upright back board 3 of the table 4, and receives motion from any suitable prime shaft or motor through the medium of a belt and pulleys, the shaft-pulley 5 being connected to it by a clutch 6, worked from the front of the machine by a hand-lever 7. The countershafts 8, 9, 10, and 11 are geared with the shaft 2 (see Fig. 2) and give motion to the various parts of the mechanism, as will be hereinafter described.

The parts of the automatic tobacco dressing and feeding mechanism, which is arranged to distribute the dressed tobacco upon the feed-belt in a continuous stream of uniform density and quantity, free from lumps or any uneven qualities, are mounted on a stand or frame, which may be altogether separate from the frame that carries the cigarette-forming devices. This mechanism consists, generally, in the combination of one or more sets of granulating-disks or rotary cutters mounted in order above the level of the feed-belt and several inclined shaking pans or trays to which a rapid lateral motion is given, the tobacco being elevated to the highest point by an endless chain or belt elevator and thence carried down through the several sets of granulators in succession until it reaches the lowermost shaking tray, by which it is distributed upon the endless traveling feed-belt 35.

12 represents the supporting-frame, and 13 the elevator carried up from a pulley (not shown) at or near the floor, over a pulley 14 above, to which motion is given by a belt 15 from an overhead shaft. The buckets of the elevator are set to empty into a hopper 16, below which is arranged a set of rapidly-revolving granulating-disks 17 17, of the usual character employed in tobacco manufacture to reduce shredded tobacco to a granulated or fine condition. The granulating-disks 17, with notched or toothed edges, are keyed in two sets upon parallel horizontal shafts, and operate in conjunction with alternate stationary plates 18, (see Figs. 18 and 19,) that fit loosely around the shafts and extend beyond the outer edges of the disks, where they are clamped at their ends between fixed cross-bars 19 19. These plates 18 form the teeth of a comb and clear the disks 17 of the tobacco. The disks 17 on one shaft project into the spaces between and overlap the disks 17 on the other shaft, and the two shafts are geared together, as seen at 20, (see Fig. 17,) to turn in opposite directions toward each other, motion being imparted to one of the shafts by the pulley 21, which receives its motion from the belt 22 leading to an overhead shaft. (Not shown.) Directly beneath these granulating-disks 17 is hung or supported a tray 23, having raised sides, and suitable pitch to discharge the tobacco into a second hopper 24, a similar set of granulating-disks 17 being arranged on a lower level. The tray 23 is attached at the back to a pivot 25 by an arm 26, and at the front is supported by a fixed cross-piece 27 on the frame-work. Lateral shaking motion is given to the tray 23 by a disk 28 set inclined on a horizontal cross-shaft 29, so as to revolve between lugs 30 on the bottom of the tray, (see Fig. 20,) the shaft 29 being driven by a belt 32 and pulley 31 from one of the upper shafts, on which the granulating-disks 17 are mounted. After passing through the first set of granulating-disks the tobacco is caught by the shaking tray 23 beneath them, and thrown by that tray into the hopper 24, beneath which is another set of granulating-disks, similar to the first set, through which it passes, and is discharged in a loose and finely-dressed condition upon a shaking tray 33, hung and operated in the same manner as the tray 23 above, and thence onto another shaking tray 34, from which the tobacco is finally distributed along the traveling feed-belt 35.

For very dry tobacco the tray 34 may be omitted and the tobacco fed from the tray 33 onto the feed-belt 35; but for general use on all grades or conditions of tobacco I have found that two shaking trays below the second set of granulating-disks, arranged, as shown in the drawings, one beneath the other, and both vibrating horizontally, but in opposite directions with respect to each other, will produce uniform and even distribution.

Figure 16:
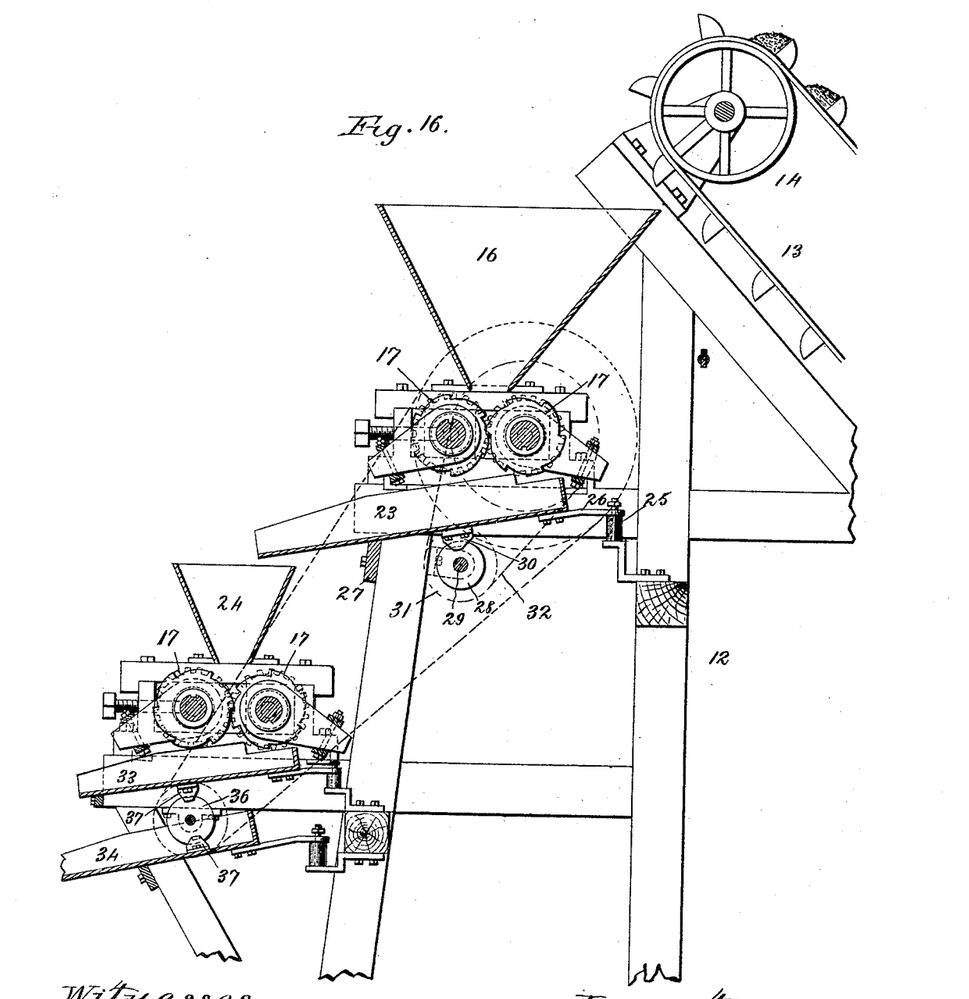
Fig. 16 is a side elevation, on an enlarged scale, of the tobacco dressing and distributing mechanism, some of the parts being shown in longitudinal section.

Vibrating motion is given to the trays 33 34 in the direction of the travel of the feed-belt from a single shaft on which is set, at an inclination, a disk 36, engaging the lugs 37 on each of the trays, the lugs of the lower tray being fixed upon the top surface and those on the upper tray on the lower surface, as shown in Fig. 16. The disk 36 receives motion through a suitable belt-and-pulley connection between its shaft, and one of the shafts carrying the upper set of granulating-disks 17.

Figure 5:
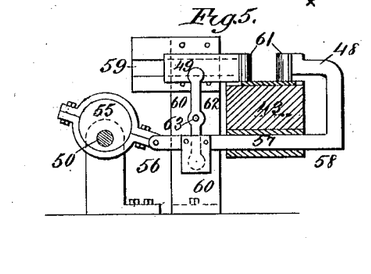
Fig. 5 is a vertical cross-section taken on the line *x y*, Fig. 3, but on an enlarged scale.
Figures 17, 18, 19, 20:
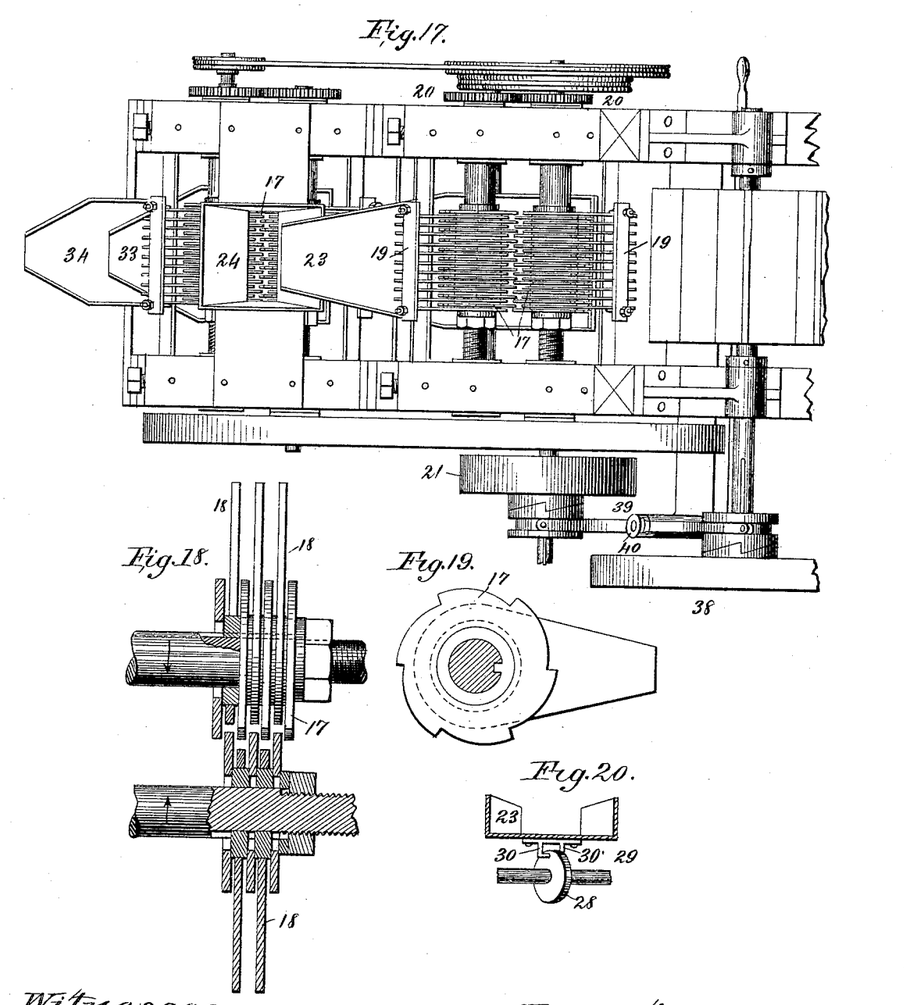
Fig. 17 is a top view.
Figs. 18, 19, and 20 are details of the same parts.

The main driving-pulleys 21 38 are connected to their shafts by clutches, Fig. 17. These clutches are connected by a bar 39, pivoted about midway of its length, and a hand-lever 40 is arranged at one side to turn the bar 39 on its pivot, and so operate both clutches by a single movement. Both trays 33 and 34 are inclined, and the discharge end of the lower one 34 is arranged directly over the feed-belt 35 to distribute the tobacco upon it at a point between the end roller 41 and a set of scrapers 42, Fig. 2, that are fixed to the sides of the belt-supporting rail 43, and project over the feed-belt 35. These scrapers 42 are formed of sheet metal bent to shape, each being attached at its outer end to the rail 43 by a slot and screw. Their inner ends being placed over the feed-belt 35 to form converging standing guides and eveners. An upright guard plate or apron 44 is fixed at the back of the feed-belt 35 in front of the shaking tray 34 to prevent escape of tobacco over the back edge. The feed-belt supporting-rail 43 has overhanging sides 45 to cover the edges of the feed-belt 35, and prevent shreds of tobacco from working under the belt, and guide-rollers 46 46 are fixed at intervals along the edge of the rail 43 to keep the feed-belt 35 true and prevent friction. The feed-belt 35, which is endless, passes around the rollers 41 and 47, the former being suitably supported on the frame of the machine just beyond the end of the supporting-rail 43, and so arranged as to bring the upper half of the belt onto the supporting-rail 43. The roller 47 is carried by the shaft 9, Figs. 7 and 8, which is geared with the main shaft 2, as before mentioned, and imparts motion to the feed belt 35. As the feed-belt 35 moves onward it carries the tobacco between the scrapers 42, which serve to bring it to the middle of the feed-belt 35, so that it will pass between the curved plates 61 of the compressing-jaws 48 49, which are operated in the following manner: From the main shaft 2 a short countershaft 50, geared up to high speed, is driven by spur-gears 51, 52, 53, and 54. This shaft carries an eccentric 55, the strap of which is connected at 56 to a bar 57, adapted to slide in a groove 58 in a plate attached to the under side of the belt-supporting rail 43. (See Fig. 5.) The bar 57 is bent upward and carries the jaw 48, extending from the front of the rail 43 over the feed-belt 35. Another jaw 49 is mounted in a slideway 59 on the post 60, and extends from the rear of the rail 43 over the feed-belt 35. These jaws 48 49, which may be called "front" and "rear" jaws, carry at their opposed ends the curved plates 61, one plate being on each jaw. 62 is a lever pivoted centrally at 63 to the post 60, its upper and lower ends being connected to the rear jaw 49 and the bar 57, respectively, by ball-and-socket joints. As the shaft 50 revolves, the eccentric 55 will cause the bar 57 and its jaw 48 to reciprocate, and the pivoted bar 62 will cause the rear jaw 49 to reciprocate also, the movement of the two jaws 48 49 being in opposite directions, so that they shall alternately approach and retreat from each other. These jaws thus acting from opposite sides against the moving tobacco condense and bring it into a narrow strip along the center of the feed-belt 35. From the compressing-jaws the tobacco passes, Fig. 2, under the top belt 64, and is carried by that belt and the feed-belt 35 between the side belts 71 71, Figs. 2 and 3, whereby the tobacco is formed into a continuous filler of suitable form, and then carried regularly forward to the wrapper-folding mechanism. The top belt 64 passes around rollers 65 66 67, Fig. 1, the roller 65 being raised above the others and of larger diameter, while the rollers 66 67 are placed in the same horizontal plane to bring that portion of the belt 64 traveling between them parallel with the feed-belt 35. The roller 67 is placed directly over the roller 47, Fig. 7, of the feed-belt 35, and driven at uniform speed therewith by spur-gears 68 69 of equal size, the latter being on the shaft 9 and the former on the shaft 70, which carries the roller 67. The side belts 71 71 are driven by sprocket-wheels 72 72, geared together and driven to move the two belts with positive motion and at equal speed, uniform with that of the feed-belt 35. The upright axles of the sprocket-wheels 72 are geared together by spur-gears 73 74, and the axle of the sprocket-wheel carrying the spur-gear 74 is connected to the countershaft 8 by bevel-gears 75 76, and the shaft 8 is geared with the main shaft 2 by the bevel-gears 77 and 78. The side belts 71 71 also pass around sprocket-wheels 79 79, mounted on vertical axles suitably supported in boxes on the frame of the machine, a short distance beyond the rollers 47 and 67, and the belts 71 71 are so arranged that they are between and covered by the belts 35 and 64 during a portion of their travel. A laterally-converging entrance at the receiving end of the passage, formed by the side belts 71 71, the feed-belt 35, and top belt 64, is made by setting the sprocket-wheels 72 72 more widely apart than the sprocket-wheels 79 79, and about midway between the two sets of sprocket-wheels the belts are brought more closely together and into parallel lines by stationary rollers or guides 80 80 81 81, two of these rollers or guides engaging the rear face of each bolt 71.

The operation of bringing the filler into shape is performed principally by the side belts 71 71, and the construction and arrangement of these side belts may be such that the continuous filler will be made square, round, or of oval shape, with the longer diameter standing perpendicularly. The belts 71 71 are constructed of a series of hard-metal links or sections 82, hinged together at the back edge and grooved or recessed on the front edge, as seen at 83, Figs. 7 and 11. The form of this recess, as before stated, may vary, for it may be angular, semicircular, or concave. The side belts 71 71 may be set closely together or spread apart more or less according to the degree of compression required for the tobacco or the thickness of the cigarette to be made, for which purpose the rollers or guides 80 81 may be adjusted laterally in any suitable manner. In the present construction the studs of the rollers 80 81 are fixed in the plates 84, which are adjustable laterally on the bottom plate 85 and held in any desired position by the screws 86, which pass through slots in said plates 84. The boxes for the axles of the sprocket-wheels 79 79 may also be adjustable laterally in any well-known manner. At the point where the top belt 64 and feed-belt 35, Fig. 8, leave the continuous filler the latter is carried onward over the bottom plate 85 by the side belts 71 71 to the mouth-piece 87, and just forward of the said point a short top belt 88, preferably formed of links constructed in the same manner as those of the side belts 71, is placed to bear upon the filler from above. The top belt 88 is mounted on sprocket-wheels 89 90 and driven with positive movement at a speed uniform with that of the side belts 71 from the shaft 10 by spur-gears 91 92, Figs. 1, 2, 3, and 8, and the shaft 10 being geared with the main shaft 2, as aforesaid. The function of the top belt 88 is to assist in maintaining the filler (which has been formed by the feed-belt 35, the side belts 71 71, and top belt 64) in a compact form and in carrying it onward to the point where the paper wrapper receives the filler.

Figures 7, 8, 9, 10, 11:
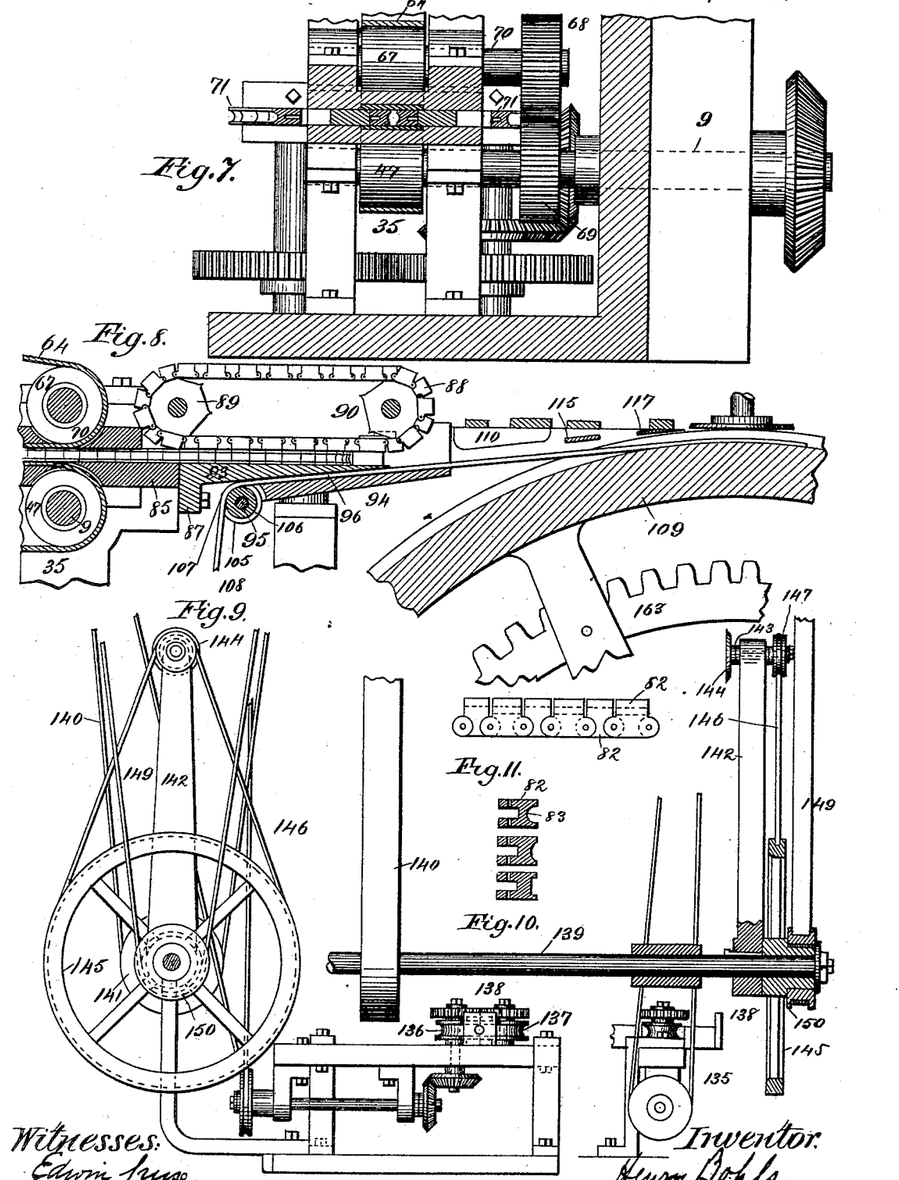
Fig. 7 is a vertical cross-section on an enlarged scale, taken on the line *x x*, Fig. 3.
Fig. 8 is a longitudinal section through that part of the machine where the continuous filler and the wrapper are brought together and the wrapper is folded, the filler forming and feeding belts and the wrapper-folding guides being shown generally in section.
Figs. 9 and 10 are views on an enlarged scale of the cutting device, the first-named figure being a side view looking from the feeding end of the machine with some of the parts in section, and Fig. 10 a view from the back of the machine, looking toward the front.
Fig. 11 illustrates the construction of the side belts that compress and bring the continuous filler to shape.
Figure 12:
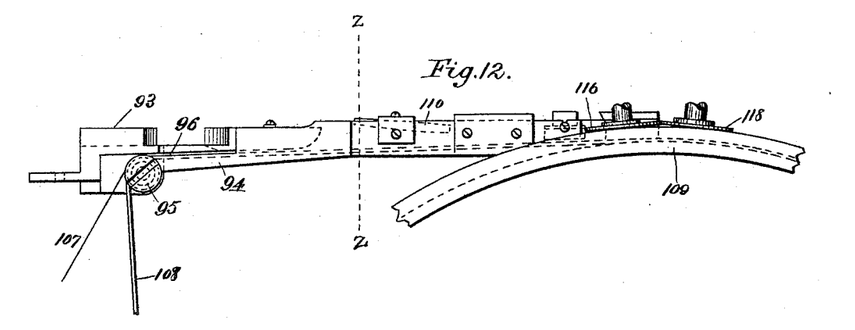
Fig. 12 is a side view, on an enlarged scale, of the wrapper-folding guide and folding-disks.
Figure 13:
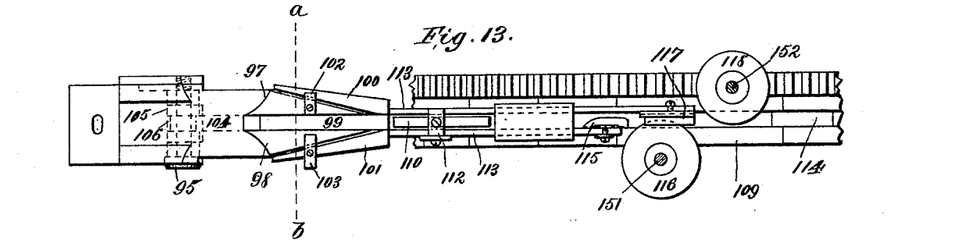
Figure 14:
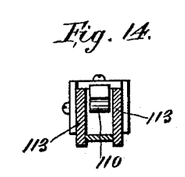
Figure 15:
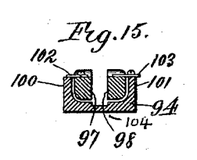

The mouth-piece 87, Figs. 8, 12, and 13, is bolted to the main frame of the machine and its upper surface is flush with the upper face of the plate 85. The mouth-piece is formed of upper and lower sections 93 94, hinged together by the headed pin 95 in such manner that when closed a space 96 will be formed between them. From the point where the side belts 71 71 leave the continuous filler the section 93 has upwardly-projecting portions 97 98, which extend forward to its end and form a guideway 99, the latter being open at the bottom and top. The outer sides of the projections 97 98 are tapering and rounded on their lower corners, Fig. 15. The section 94 also has upwardly-projecting portions 100 101, the inner sides of which converge so as to form a V-shaped recess to receive the V-shaped front end of the section 93. The corners of the recess are rounded in order to make the bottom of the recess slightly concave to conform in outline to the lower convex surface of the projections 97 98. The two sections are held in proper relation to each other by the buttons 102 103, the former being pivoted to one of the projections on the section 93 and the latter to one of those on the section 94. The section 94 has a groove 104 (indicated in dotted lines in Fig. 13 and in full lines in Fig. 15) of substantially the same width as the channel 99. The pin 95 carries a roller 105, the upper face of which is level with that of the section 94. The roller 105 has a peripheral groove 106, which registers with the groove 104 in the section 94. The paper wrapper 107 passes over the roller 105 into the space 96, and as it passes onward the converging sides of the projections 100 101 will gradually turn up its edges until the wrapper assumes a U shape. An endless belt 108 passes over the groove 106 in the roller 105 and along the groove 104 beneath the paper wrapper 107 and around the greater portion of the periphery of the carrier-wheel 109. This belt is substantially of the same width as the cigarette to be formed, and with the paper wrapper 107 carries the continuous filler forward from the mouth-piece 87 to the folding and pasting devices. The open guideway 99 permits the continuous filler to pass on to the paper wrapper, and as the filler emerges from the end of the mouth-piece 87 the paper wrapper 107 will surround about three-fourths of its circumference. At this stage the filler, having passed from under the top belt 88, passes under a presser-foot 110, Figs. 12, 13, and 14, which holds down the filler after it emerges from under the top belt 88, and before the first standing side of the wrapper is folded over. This presser-foot 110 is placed between the standing sides of the paper, leaving suitable spaces between it and the side plates 113 of the folding-guide to permit the passage of the paper, and it acts to press down below the standing edges of the paper any loose shreds of tobacco before the paper is folded and lapped. An arm 111, Fig. 3, extending from some fixed point over the plates 113 of the folding-guide supports the foot 110, which is attached to it by the cross-piece 112.

The wrapper-folding guide extends from the end of the mouth-piece 87, and consists of two plates 113 113, set parallel to each other directly above and in close proximity to the rim of the carrier-wheel 109, the belt 108 carrying the wrapper and filler between them to the groove 114 in the carrier-wheel 109. After passing beyond the foot 110 one of the standing sides of the wrapper comes in contact with the folding-lip 115, supported by and projecting inwardly from one of the plates 113 of the guide. This lip turns the side of the wrapper over and brings it under the revolving disk 116, which folds it over upon the filler. The other standing side of the wrapper is turned over by the folding-lip 117, Figs. 8 and 13, which is so located as to bring this turned-over side into contact with the upper face of the disk 116 to receive the paste and also bring it under the disk 118, which presses it down and causes it to adhere to the previously-folded side. The spindles 151 152, Figs. 1, 2, and 3, of the disks 116 and 118 are supported in suitable bearings attached to the frame of the machine and extend upward from the disks. The spindle 151 carries a gear 153, which meshes with a similar gear 154 on the spindle 152, and the spindle 151 also carries at its upper end a pulley 155, from which a belt 156 leads to a pulley 157 on the shaft 2. Motion is thus imparted to the disks 116 118 from the shaft 2, and the disks revolve in opposite directions.

Figure 4:
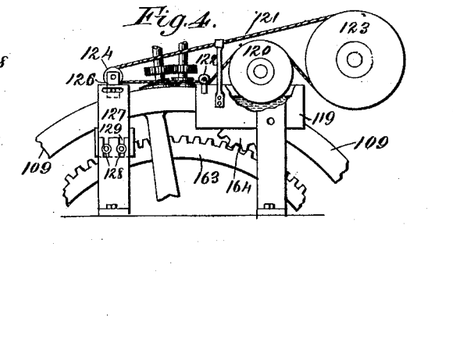
Fig. 4 is an elevation of the pasting device on an enlarged scale.

The pasting apparatus (shown in Fig. 3 in position for operation and in detail on a larger scale in Fig. 4) consists of a paste-trough 119, a fountain wheel or roller 120, (partially immersed and turning continually in the paste,) and an endless paste-carrying device 121, formed of fine cord or thread running over the fountain-wheel in a groove formed in the rim, and thence under a pulley 122 to the top face of the disk 116. A large pulley 123 at one end of the pasting apparatus and a small pulley 124 at the opposite end carry and guide the cord or thread 121. The wheel 120 is mounted on the front end of the shaft 125, which operates the belt 130 of the carrier-wheel 109, thereby dispensing with a separate shaft-connection for the paste apparatus. The shaft 125 is geared to the shaft 11 by gears 158 and 159, of equal diameter, and the shaft 11 is geared with the main shaft 2 by the bevel-gears 161 162. The smaller pulley 124 is capable of adjustment both up and down and sidewise for the purpose of regulating the contact of the paste-carrying thread with the top face of the disk 116, the pulley 124 being fixed on a slide 126, laterally adjustable on the top of the bracket 127, this last-named piece being formed also in two parts having overlapped ends held together by clamp-screws 128, passing through the slots 129, so that the length of the piece can be adjusted to change the position of the pulley in a vertical direction. Any required degree of contact and pressure of the thread upon the disk 116, to regulate the quantity of paste laid on the disk, is obtained by such adjustment.

Figure 1:
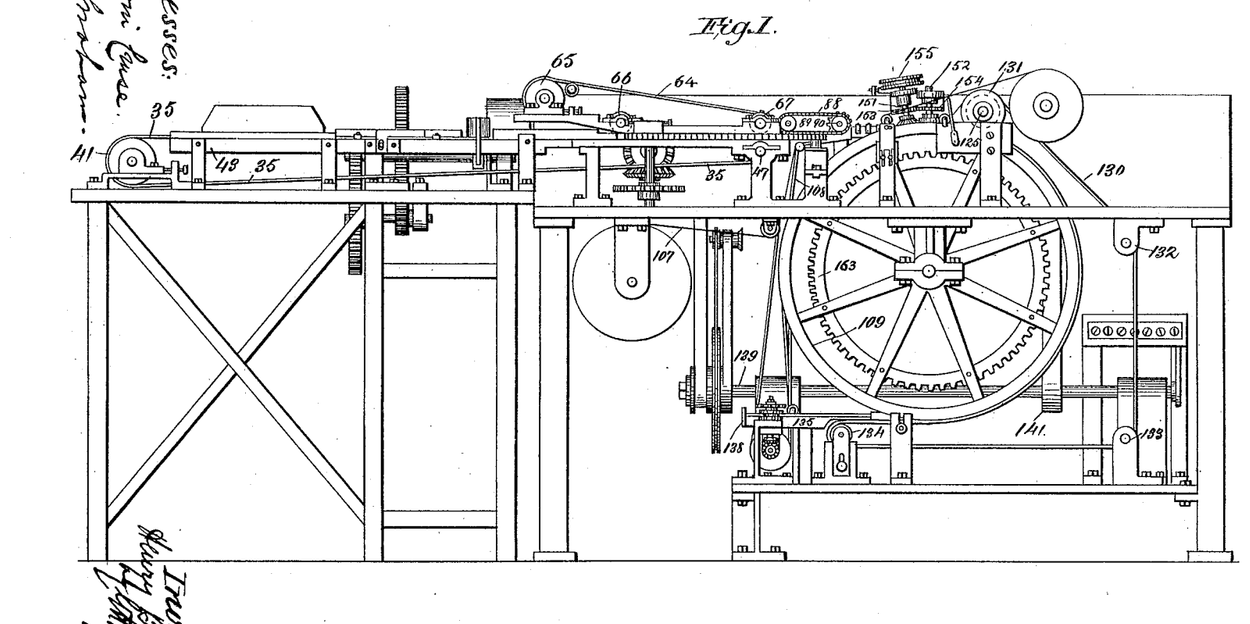
Figure 1 represents a general view of the machine from the front without the tobacco dressing and feeding attachment.

The pasting apparatus is cleanly in its operation and very economical in its use of paste, because it can be regulated to feed and supply the exact quantity of material needed and apply it neatly in a fine line under the overlapped edge of the paper, while no waste or droppings escape to clog or soil the other parts of the machine. It will be noticed that the first disk 116 is employed as a folding and also as a pasting disk, and that the cord or thread 121 first becomes charged with the paste by passing over the fountain-wheel 120 instead of through the body of paste, and then, by running upon the disk 116, lays a fine line of the adhesive substance upon the top face of the disk at a point close to or within the edge, such point of application being regulated by adjusting the thread-carrying pulleys to or from the disk. After leaving the folding and pasting devices the continuous cigarette passes with the belt 108 into the groove 114, formed in the periphery of the wheel 109, and is held therein by the belt 130, Fig. 1, which may, if desired, have a groove in its face to prevent the cigarette being flattened. The carrier-wheel 109 has a toothed wheel 163, of less diameter than itself, secured to its spokes, as shown in Fig. 1, and a gear 164, Figs. 2, 3, and 4, carried by the shaft 11, engages the teeth on the wheel 163 and imparts motion to it and the carrier-wheel 109. The groove 114 is preferably rounded at its bottom surface. The belt 130 passes around pulleys 131, 132, 133, and 134, so arranged as to hold the belt 130 against about one-half of the periphery of the wheel 109, and the continuous cigarette is thus carried around to the guide-plate 135, where the belts 108 130 leave it. Passing along the guide-plate 135 the cigarette is then gripped by the two grooved rollers 136 137, Figs. 9 and 10, geared to run in opposite directions, and fed through an aperture in a plate 138, attached to the end of the guide 135, where it is cut into suitable lengths. The pulley 131 is carried by the shaft 125, and the belt 130 receives its motion therefrom.

Figures 2, 3:
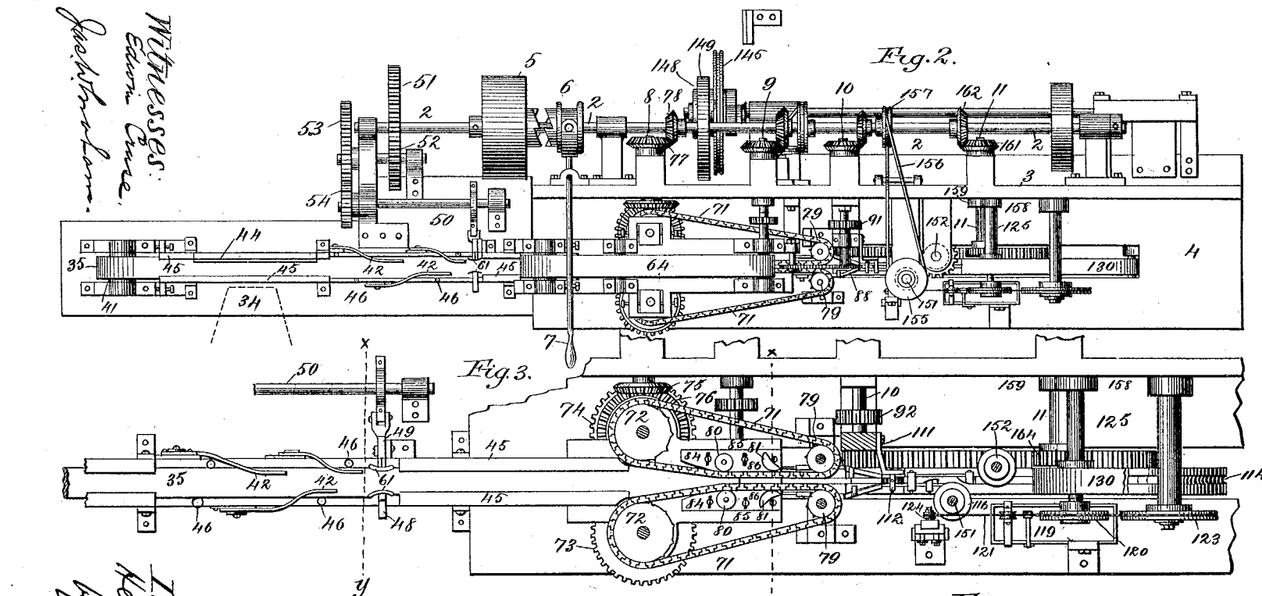
Fig. 2 is a top view.
Fig. 3 is a similar view on a larger scale with some of the top work removed to expose parts that are covered and not clearly shown in Fig. 2.
Figure 6:
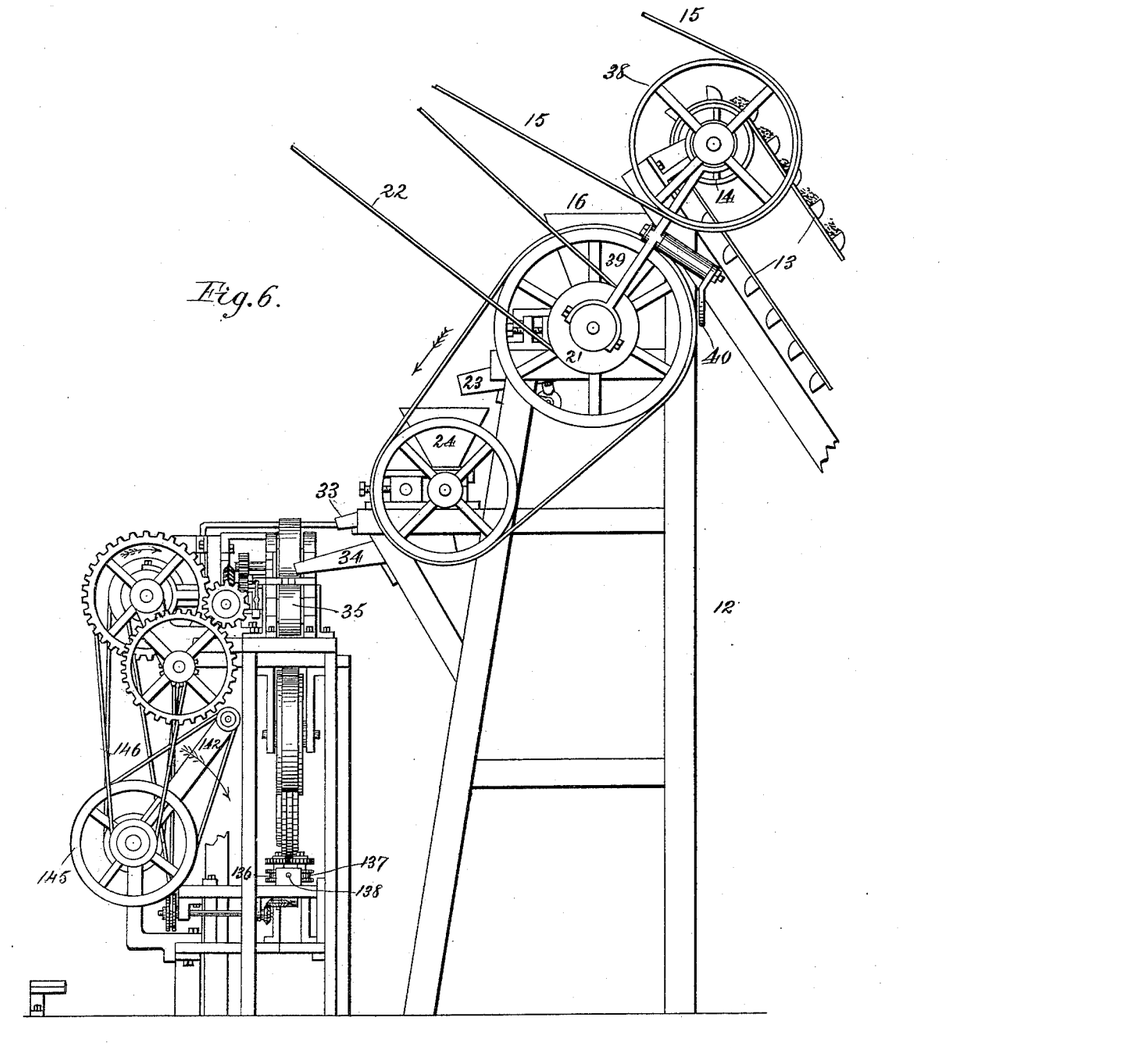
Fig. 6 is an end view of the machine proper and a side elevation of the tobacco dressing and feeding attachment thereof, the whole being viewed from the feeding end.

The construction of the cutting apparatus is represented in Figs. 9 and 10, and its general arrangement with the other parts for operation in this improved machine shown in Figs. 1, 2, and 6. A shaft 139 is driven from the upper shaft 2 by the belt 140 and pulley 141, and carries an arm 142, having at its free end a short spindle 143, on which is mounted a cutting-disk or circular knife 144, the arm 142 being of suitable length and properly set to carry the cutter in a circular path across the aperture in the fixed plate 138, from which the continuous cigarette emerges. The cutter is rotated at the end of the arm by a sheave 145, loose on the shaft 139, and a belt 146, running around a smaller sheave or pulley 147, fastened on the cutter-spindle, motion being given to the sheave 145 from a pulley 148 on the principal shaft 2 of the machine by a belt 149 and a pulley 150, fast on the hub of the sheave 145. By these means the cutting-disk is rotated continually at high speed while it is carried around in a circular path by the revolving arm. This cutting device has many advantages over the simply rotating knife heretofore employed in these machines, and particularly in producing a clean cut without crushing down the cigarette or tearing the wrapper at the line of cut, and also in running for a considerable time without the necessity of resharpening.

From the foregoing description of the machine it will be obvious that the operation of making cigarettes thereby is continuous from the stage at which the tobacco is first fed onto the feed-belt from the granulating and dressing mechanisms to that at which the continuous cigarette is cut into lengths suitable for the market.

Having described my invention, I claim—

1. In a cigarette-machine, the combination with a feed-belt, of mechanism to granulate the tobacco, and one or more inclined shaking trays adapted to have lateral vibrating motion substantially parallel to the direction in which the feed-belt travels and to receive the tobacco from the granulating mechanism and distribute it upon the feed-belt, substantially as described.

2. In a cigarette-machine, the combination, with a feed-belt, of mechanism to granulate the tobacco, a series of inclined trays adapted to have lateral vibrating motion and to receive the tobacco from the granulating mechanism, the lower tray of the series being located to distribute the tobacco upon the feed-belt, and having a movement substantially parallel to the direction in which the feed-belt travels, and a guard-plate located opposite the lower tray and over the edge of the feed-belt remote from the tray, substantially as specified.

3. In a cigarette-machine, the combination, with a feed-belt and granulating-disks to dress and separate the tobacco, of a series of inclined trays adapted to be given lateral shaking motion and to receive the tobacco from the granulators, the lower tray of the series being arranged to distribute the granulated tobacco upon the feed-belt, and having a movement substantially parallel to the direction in which the feed-belt travels, and an elevator for carrying the tobacco to the upper set of granulating-disks, substantially as described.

4. The combination, with a feed-belt of a cigarette-machine, of compressing-jaws arranged above the feed-belt and having a reciprocating movement to and from each other transversely to the direction of travel of said feed-belt, substantially as described.

5. The combination of a feed-belt of a cigarette-machine, compressing-jaws adapted to reciprocate across the belt from opposite sides, the connecting-lever 62, the revoluble shaft 50, and an eccentric and strap carried by the shaft 50 and actuating the compressing-jaws, substantially as described.

6. In combination with a feed-belt, a series of flexible scraping-blades 42, constructed as described, and extending over the edge of the belt from opposite sides and adapted to bring the tobacco to the middle of the feed-belt, substantially as described.

7. In a cigarette-machine, the rotating disk 116, adapted to act as a pasting-disk, in combination with a paste-supply trough having a paste-feeding wheel partially immersed and rotating in the trough, and a paste-carrying device formed of an endless cord or thread which is carried over the top of said feed-wheel and arranged to run in contact with the face of the disk, substantially as described.

8. The combination, with a rotating pasting-disk and a paste-trough, of a paste-feeding wheel partly immersed and having rotation in said trough, a cord or thread arranged to travel over the top of said feeding-wheel clear of the trough and take a charge of paste from the wheel, and guide-pulleys adapted to carry said cord or thread in working contact across the face of said pasting-disk, substantially as described.

9. In a cigarette-machine, an endless feed-belt and compressing and feeding-in belts arranged above and at the sides of the feed-belt and forming with it a filler-shaping passage, combined with a wrapper-supply reel, folding and pasting devices, a grooved carrier-wheel, belts operating therewith for continuing the movement of the continuous cigarette after it has passed the folding and pasting devices, a cutter for severing the continuous cigarette into suitable lengths, and gearing for imparting uniform movement to the feed-belt, the feeding-in and compressing belts, and the carrier-wheel and its belts, and for timing the cutter with respect to the forward movement of the continuous cigarette, substantially as set forth.

10. In a cigarette-machine, filler-forming belts, a grooved carrier-wheel, and a carrier-belt 108, adapted to travel in the groove around the greater portion of the periphery of said carrier-wheel, combined with a mouth-piece comprising an upper and a lower section, the lower section having a V-shaped recess the bottom of which is concave, and having also a groove in the bottom of said recess for the reception of the carrier-belt, and the upper section having a V-shaped end the lower surface of which is convex to fit in the recess in the lower section, a space being left between the two sections for the passage of the paper wrapper above the carrier-belt, said upper section having also a guideway along which the filler passes onto the paper wrapper, and with folding and pasting devices located in advance of the mouth-piece, substantially as set forth.

In testimony that I claim the foregoing I have hereunto set my hand and seal.

HENRY BOHLS. [L. S.]

Witnesses:
EDWARD E. OSBORN,
CHAS. E. KELLY.